(12) United States Patent
Suematsu et al.

(10) Patent No.: US 7,697,574 B2
(45) Date of Patent: Apr. 13, 2010

(54) RADIO COMMUNICATION APPARATUS, TRANSMITTER APPARATUS AND RECEIVER APPARATUS

(75) Inventors: Eiji Suematsu, Nara (JP); Hiroyo Ogawa, Koganei (JP); Kiyoshi Hamaguchi, Koganei (JP); Yozo Shoji, Koganei (JP)

(73) Assignees: Sharp Kabushiki Kaisha, Osaka (JP); National Institute of Information and Communications Technology, Tokyo (JP)

(*) Notice: Subject to any disclaimer, the term of this patent is extended or adjusted under 35 U.S.C. 154(b) by 2012 days.

(21) Appl. No.: 10/399,566

(22) PCT Filed: Oct. 17, 2001

(86) PCT No.: PCT/JP01/09105

§ 371 (c)(1),
(2), (4) Date: Apr. 18, 2003

(87) PCT Pub. No.: WO02/33862

PCT Pub. Date: Apr. 25, 2002

(65) Prior Publication Data

US 2004/0015990 A1 Jan. 22, 2004

(51) Int. Cl.
*H04J 3/04* (2006.01)

(52) U.S. Cl. .................................. 370/534; 455/131
(58) Field of Classification Search .............. 370/312, 370/533, 535, 537, 538, 534; 455/3.02, 17, 455/73, 130, 131
See application file for complete search history.

(56) References Cited

U.S. PATENT DOCUMENTS

| 5,706,048 | A | 1/1998 | Davis |
| 6,915,529 | B1 | 7/2005 | Suematsu et al. |
| 6,973,328 | B1 * | 12/2005 | Suematsu ................ 455/552.1 |
| 7,020,890 | B1 * | 3/2006 | Suematsu et al. ............. 725/78 |

(Continued)

FOREIGN PATENT DOCUMENTS

CA    2 229 904 A1    8/1998

(Continued)

OTHER PUBLICATIONS

Hiroyo Ogawa, Jouhou Tsuushin Journal, Jul. 1, 2000, vol. 18, No. 7, pp. 37-38.

(Continued)

*Primary Examiner*—Brenda Pham
(74) *Attorney, Agent, or Firm*—Birch, Stewart, Kolasch & Birch, LLP (57) ABSTRACT

The present invention provides a radio communication device, a transmitter and a receiver capable of handling a plurality of signal waves. A radio communication device has a millimeter-wave transmitter (15) and a millimeter-wave receiver (29). Millimeter-wave transmitter (15) includes a multiplexing circuit (1), a millimeter-wave up-converter (4) and an antenna (3), and the millimeter-receiver includes an antenna (31), a millimeter-wave down-converter (32) and an output processing circuit (45). The signal waves dedicated to the user are modulated by a modulation circuit (121 to 124) so as to be allocated between the ground broadcast waves and satellite broadcast waves. The frequencies are multiplexed in an intermediate frequency band, after that, the multiplexed frequencies are converted into a millimeter-wave band and the resultant is transmitted. On the reception side, the multiplexed waves are down-converted, separated to signal waves and demodulated.

14 Claims, 9 Drawing Sheets

U.S. PATENT DOCUMENTS 7,254,826 B2 * 8/2007 Mori .......................... 725/114

FOREIGN PATENT DOCUMENTS

| JP | 64-5238 A | 1/1989 |
| --- | --- | --- |
| JP | 4-355527 A | 12/1992 |
| JP | 11-41122 A | 2/1999 |
| JP | 11-313020 A | 11/1999 |
| JP | 2000-67119 A | 3/2000 |
| JP | 2000-307495 A | 11/2000 |
| WO | WO 97/36390 A | 10/1997 |

OTHER PUBLICATIONS

Kiyoshi Hamaguchi et al., Denshi Jouhou Tsuushin Gakkai Sougou Taikai Kouen Ronbunshuu SC-3-1, Mar. 7, 2000, pp. 415-416.
Hideharu Suematsu et al., Denshi Jouhou Tuushin Gakkai Sougou Taikai Kouen Ronbunshuu SC-3-2, Mar. 7, 2000, pp. 417-418.
Futoshi Kuroki et al., Denshi Jouhou Tsuushin Gakkai Sougou Taikai Kouen Ronbunshuu SC-3-8, Mar. 7, 2000, pp. 428-429.
Kiyoshi Hamaguchi et al., Denshi Jouhou Tsuushin Gakkai Sougou Taikai Kouen Ronbunshuu C-2-97, Mar. 7, 2001, p. 144.
Norimasa Ejima et al., The 1997 IEICE General Conference C-2-123, p. 178.
Hisao Nakakita et al., 1997 IEEE MTT-S Digest, pp. 1143-1146.

* cited by examiner

RADIO COMMUNICATION APPARATUS, TRANSMITTER APPARATUS AND RECEIVER APPARATUS

This application is the national phase under 35 U.S.C. §371 of PCT International Application No. PCT/JP01/09105 which has an International filing date of Oct. 17, 2001, which designated the United States of America.

TECHNICAL FIELD

The present invention relates to a radio communication device, a transmitter and a receiver, and more particularly to a radio communication device, a transmitter and a receiver for radio-transmitting a plurality of kinds of signals.

BACKGROUND ART

As an example of a millimeter-wave band transmitter/receiver for transmitting and receiving signals in a millimeter-wave band, there is a video transmission system of a 50 GHz band described in "New Version of 50 GHz Simple Radio Equipment" (The 1997 IEICE General Conference C-2-123, pp. 178) (Literature 1).

Figure 10A:
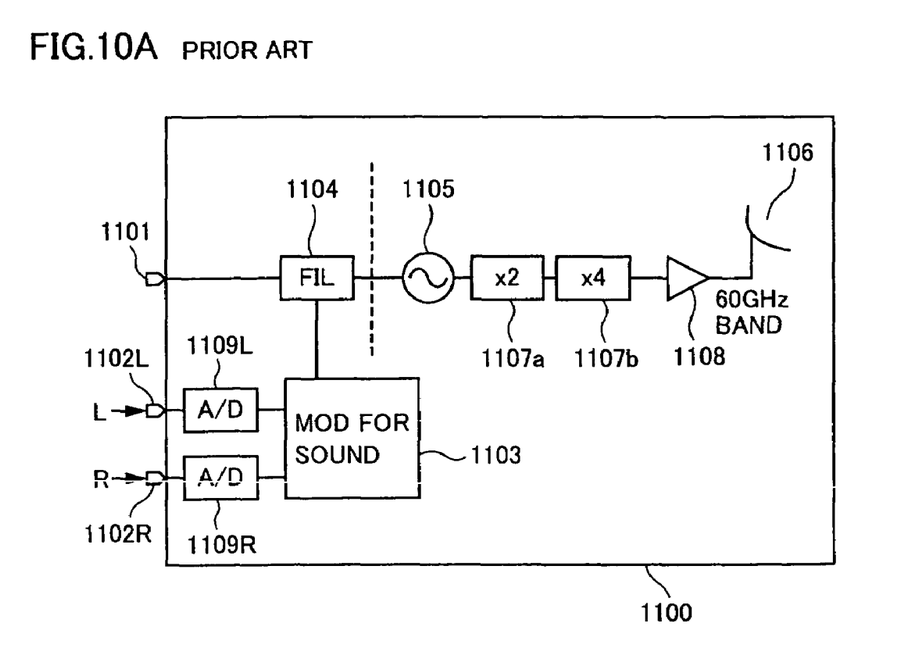
FIGS. 10A and 10B are diagrams showing outline of the configuration of a millimeter-wave band transmitter/receiver of Literature 1.
Figure 10B:
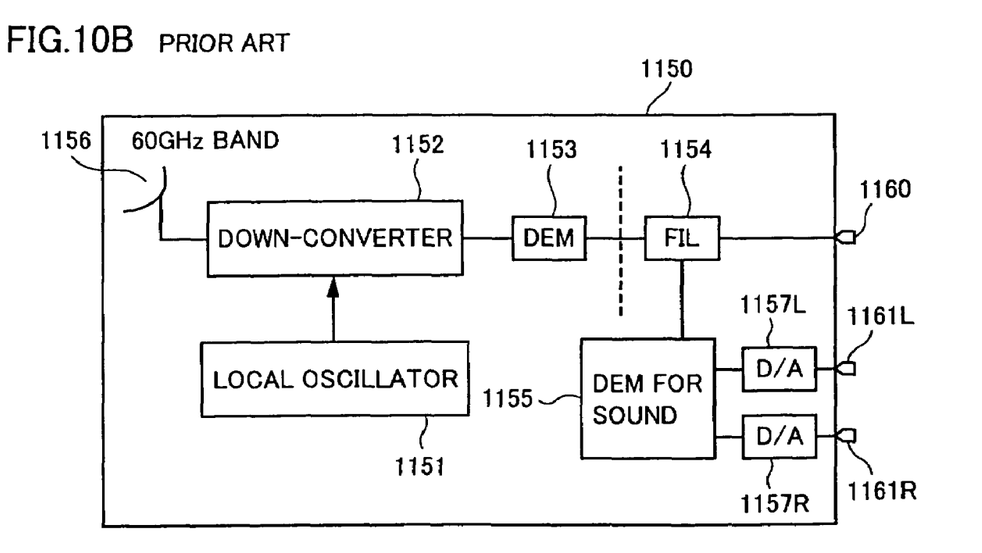

The millimeter-wave band transmitter/receiver in Literature 1 includes a transmitter 1100 shown in FIG. 10A and a receiver 1150 shown in FIG. 10B. As will be described below, each of transmitter 1100 and receiver 1150 is constructed by a baseband section (indoor section) and a radio section (outdoor section).

Transmitter 1100 has: a baseband section including a modulator 1103 (indicated as "MOD for sound" in the diagram), a bandpass filter 1104 (indicated as "FIL" in the diagram), and analog/digital (A/D) converters 1109L and 1109R; and a radio section including a frequency modulator 1105, a frequency doubler 1107a (indicated as "x2" in the diagram), a frequency quadruplet 1107b (indicated as "x4" in the diagram), an amplifier 1108, and an antenna 1106.

The baseband section in transmitter 1100 multiplexes a video signal and a sound signal. Sound stereo signals (R and L) inputted from sound signal input terminals 1102L and 1102R are converted into digital signals by analog/digital converters 1109L and 1109R and the digital signals are modulated by modulator 1103. An output of modulator 1103 is combined with a video signal received from a video signal input terminal 1101 via bandpass filter 1104. In such a manner, a video transmission signal of one channel in the baseband is generated.

The generated video transmission signal is modulated by frequency modulator 1105 of a 6 GHz band included in the radio section. An output of frequency modulator 1105 is frequency-modulated by being multiplied by eight times via frequency doubler 1107a and frequency quadruplet 1107b and, further, the modulated signal is amplified via amplifier 1108. From antenna 1106, the generated millimeter-wave video transmission signal is radiated.

Receiver 1150 includes: a radio section including a local oscillator 1151, a down-converter 1152, an antenna 1156, and a frequency demodulator 1153 (indicated by "DEM" in the diagram); and a baseband section including a filter and distributor 1154 (indicated as "FIL" in the diagram), a sound demodulator 1155 (indicated as "DEM for sound" in the diagram), and digital/analog (D/A) converters 1157L and 1157R.

Down-converter 1152 down-converts a received video transmission signal on the basis of an output of local oscillator 1151 in the 50 GHz band. An IF (Intermediate Frequency) signal outputted from down-converter 1152 is demodulated by frequency demodulator 1153. A baseband signal is outputted from frequency demodulator 1153. The generated baseband signal is demultiplexed into a sound signal and a video signal via filter 1154. The sound signal is demodulated by demodulator 1155, thereby generating sound stereo signals (R and L). The video signal and sound stereo signals are supplied to a display device having a video terminal 1160 and sound terminals 1161L and 1161R.

Another example of the millimeter-wave band transmitter for transmitting signals in the millimeter-wave band, there is a transmitter for an HDTV (High Definition TV) adapted to the 60 GHz band described in "60-GHz-Band Ultracompact Transmitter for HDTV (1997 IEEE MTT-S Digest, pp. 1143-1146) (Literature 2). A transmitter 1200 of Literature 2 will be described by referring to FIGS. 11 and 12.

Figure 11:
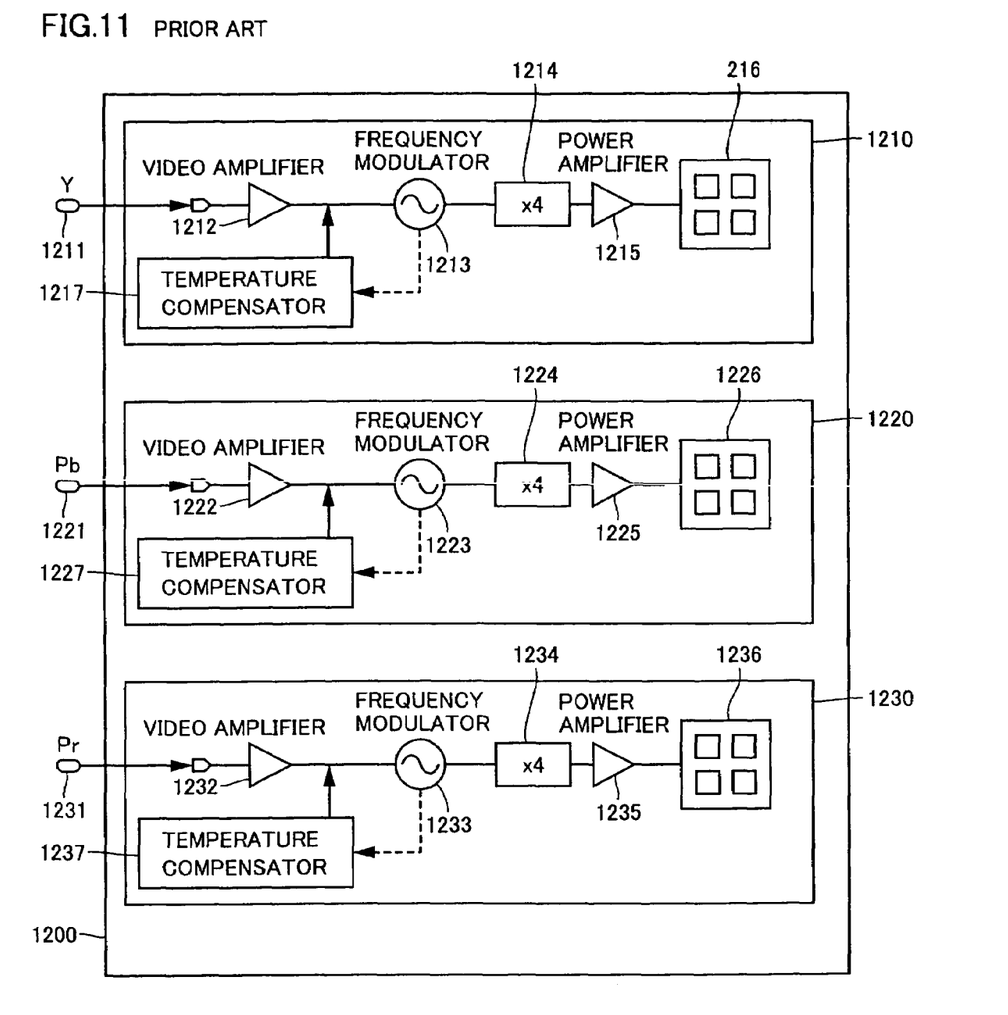
FIG. 11 is a diagram showing outline of the configuration of a millimeter-wave band transmitter of Literature 2.
Figure 12:
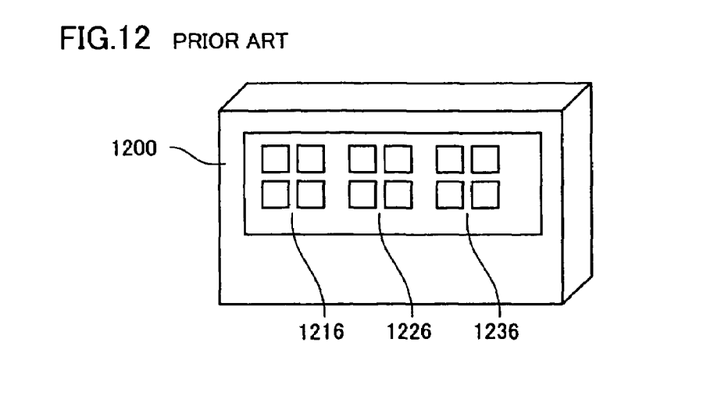
FIG. 12 is a diagram showing an external view of the transmitter of FIG. 11.

Transmitter 1200 in Literature 2 has three kinds of millimeter-wave transmitters 1210, 1220 and 1230. Transmitter 1200 receives video component signals (Y, Pb and Pr) as input signals. A luminance signal Y is inputted to millimeter-wave transmitter 1210 via an input terminal 1211, a color difference signal Pb is inputted to millimeter-wave transmitter 1220 via a terminal 1221, and a color difference signal Pr is inputted to millimeter-wave transmitter 1230 via a terminal 1231.

Millimeter-wave transmitter 1210 has a video amplifier 1212, a temperature compensator 1217, a frequency modulator 1213, a frequency quadrupler 1214 (indicated as "x4" in the diagram), a power amplifier 1215, and an antenna 1216. Millimeter-wave transmitter 1220 has a video amplifier 1222, a temperature compensator 1227, a frequency modulator 1223, a frequency quadrupler 1224, a power amplifier 1225 and an antenna 1226. Millimeter-wave transmitter 1230 has a video amplifier 1232, a temperature compensator 1237, a frequency modulator 1233, a frequency quadrupler 1234, a power amplifier 1235 and an antenna 1236.

Millimeter-wave transmitters 1210, 1220 and 1230 generate radio signals modulated in the millimeter-wave band and radiate the generated radio signals from antennas 1216, 1226 and 1236, and radiated signals Y, Pb and Pr are multiplexed in a space.

More specifically, millimeter-wave transmitters 1210, 1220 and 1230 amplify input video component signals to proper levels by video amplifiers 1212, 1222 and 1223, respectively. Outputs of video amplifiers 1212, 1222 and 1223 are inputted to frequency modulators 1213, 1223 and 1233 and frequency-modulated. The frequency of the frequency-modulated signal is multiplied by four by frequency quadruplers 1213, 1224 and 1234, thereby increasing frequency shift and modulated frequency of frequency modulation.

The modulated signals up-converted into millimeter waves are amplified by power amplifiers 1215, 1225 and 1235 and radiated from antennas 1216, 1226 and 1236. Millimeter-wave band modulated signals Y, Pb and Pr are combined to a video signal in space.

In the system of Literature 1, information which can be transmitted by a single transmitter/receiver is only one channel including a video image and sound. Therefore, in a house, video signals from a plurality of electronic devices and broadcast wave signals cannot be radio-connected. Specifically, TV (television) broadcast waves and video and sound signals from electronic devices such as a video, a DVD (digital versatile disc), a TV camera and a personal computer cannot be radio-connected simultaneously and independently in a house. Further, a plurality of such electronic devices cannot be carried to different rooms and used simultaneously at the different places.

Transmitter 1200 of Literature 2 transmits a video component signal for high definition TV. From transmitter 1200, video signals of three channels of the NTSC system can be transmitted. However, transmitter 1200 needs three kinds of transmission units. In the configuration of using three kinds of transmission units, when stability of the frequency of the frequency modulator fluctuates, stable demodulation cannot be performed on the reception side. Therefore, extremely stable frequency modulation is required.

In the configuration of transmitter 1200, however, a frequency modulator of a wide range is necessary for video signals and the frequency has to be shifted. Consequently, an oscillator of high stability cannot be used.

In transmitter 1200, temperature compensators 1217, 1227 and 1237 for frequency modulation of a broadband are provided. However, the frequency is basically stabilized by a dielectric resonator of 15 GHz band, and it is difficult to realize stable oscillation.

Further, to convert the modulation wave into millimeter-wave radio frequencies, the frequency is multiplied by four. As a result, frequency fluctuation in the modulation wave increases by four times, so that frequency stability is worsened in the radio frequency band of the millimeter waves. In addition, the electronic devices are vulnerable to mechanical fluctuations and power source voltage fluctuations, so that it is difficult to carry the devices to different rooms and use them.

The present invention therefore has been achieved to solve the problems and its object is to provide a radio communication device, a transmitter and a receiver corresponding to millimeter waves, capable of stably transmitting/receiving a plurality of different signal waves.

DISCLOSURE OF THE INVENTION

A radio communication device according to an aspect of the present invention includes: a transmitter having a configuration of transmitting, as millimeter-waves, multiplex waves in which broadcast waves including a ground broadcast wave, a satellite broadcast wave or a cable television broadcast wave and signal waves dedicated to the user which are different from the broadcast waves are allocated in different positions on a frequency axis; and a receiver having a configuration of receiving an output of the transmitter and down-converting the broadcast waves and the signal waves dedicated to the user.

Preferably, the transmitter includes: a multiplexing circuit for multiplexing the broadcast waves and the signal waves dedicated to the user in accordance with the allocation; and an up-converter for up-converting the multiplexed waves outputted from the multiplexing circuit into millimeter-waves, and the receiver includes: a receiving unit for receiving an output of the transmitter; and a down-converter for down-converting the multiplexed waves received by the receiving unit.

Particularly, the signal waves dedicated to the user include video and sound signals from at least one electronic devices including a television receiver, a video recorder, a video camera and a personal computer. The signal waves dedicated to the user are multiplexed on the satellite broadcast waves in a stage of intermediate frequencies or/and the ground broadcast waves and allocated between the frequency band of the ground broadcast waves and the frequency band of the satellite broadcast waves. The signal waves dedicated to the user may be signal waves obtained by modulating video and sound signals by a plurality of modulating means.

Preferably, the multiplexing circuit includes: a converting circuit for converting the cable television broadcast waves into intermediate frequencies; and a circuit for multiplexing the cable television broadcast waves of the intermediate frequencies and the signal waves dedicated to the user.

Preferably, the receiver further includes: a distributor for distributing an output of the down-converter to the broadcast wave and the signal wave dedicated to the user; and a demodulator for receiving an output of the distributor and demodulating the signal waves dedicated to the user.

The transmitter has a function of changing a frequency band of the signal waves dedicated to the user, and the receiver has a function of setting a use channel of the signal waves dedicated to the user in accordance with the frequency band of the signal waves dedicated to the user.

Particularly, a video component signal and a sound signal are inputted as the signal waves dedicated to the user, and the multiplexing circuit includes modulation means for modulating the video component signal and the sound signal, and a circuit for multiplexing the signals after modulation.

Particularly, a D-terminal video signal and a sound signal for high definition TV are inputted as the signal waves dedicated to the user, and the multiplexing circuit includes modulation means for modulating the D-terminal video signal and the sound signal, and a circuit for modulating the signals after modulation.

A transmitter according to another aspect of the present invention includes: a multiplexing circuit for multiplexing broadcast waves including a ground broadcast wave, a satellite broadcast wave or a cable television broadcast wave and signal waves dedicated to the user which are different from the broadcast waves so as to be allocated in different positions on a frequency axis; and an up-converter for up-converting the multiplexed waves outputted from the multiplexing circuit into millimeter waves.

A receiver according to still another aspect of the present invention, for receiving millimeter-waves, which corresponds to a transmitter having a configuration of transmitting, as millimeter-waves, multiplexed waves in which broadcast waves including ground broadcast waves, satellite broadcast waves or cable television broadcast waves and signal waves dedicated to a user which are different from the broadcast waves are allocated in positions different from each other on a frequency axis, includes: a receiving unit for receiving the multiplexed waves; a down-converter for down-converting the broadcast waves and the signal waves dedicated to the user; a distributor for distributing an output of the down-converter into the broadcast waves and the signal waves dedicated to the user; and a demodulator for receiving an output of the distributor and demodulating the signal waves dedicated to the user.

According to the radio communication device, transmitter and receiver, TV broadcast waves and video and sound signals from electron devices such as a video, a television camera or a personal computer can be simultaneously and independently radio-connected in a house. Consequently, a plurality of such electronic devices can be carried to different rooms and used simultaneously at different places. Further, the TV broadcast waves and video and sound signals can be adapted to multiple channels, so that a plurality of electronic devices can have different video and sound information.

Further, the radio communication device, transmitter and receiver multiplex the frequency band of the user range on the intermediate frequency band of satellite broadcast and the frequency band of ground wave broadcast. Consequently, a frequency modulator of about 700 MHz to 1 GHz can be used and frequency stability is excellent. As a result, good frequency stability can be obtained and, in addition, the frequencies can be multiplexed on the satellite broadcast, ground wave broadcast and CATV broadcast.

BEST MODE FOR CARRYING OUT THE INVENTION

A radio communication device according to embodiments of the present invention will be described below with reference to the drawings. The same or corresponding parts are designated by the same reference numerals and repetitive description will not be made.

First Embodiment

A radio communication device according to a first embodiment will be described. The radio communication device according to the first embodiment includes a millimeter-wave transmitter 15 shown in FIG. 1 and a millimeter-wave receiver 29 shown in FIG. 2.

Figure 1:
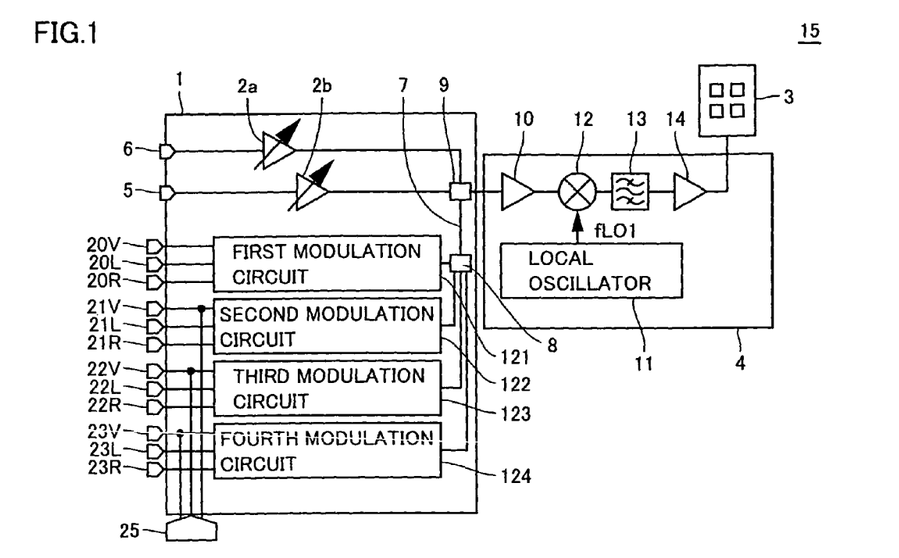
FIG. 1 is a diagram showing outline of the configuration of a millimeter-wave transmitter 15 according to a first embodiment.

Millimeter-wave transmitter 15 will be described. Millimeter-wave transmitter 15 has an IF multiplexing circuit 1, a millimeter-wave up-converter 4, and a millimeter antenna 3.

IF multiplexing circuit 1 will be described. First and second TV (television) broadcast waves are inputted to connection terminals 6 and 5, respectively. Each of the first and second TV broadcast waves includes intermediate frequency waves of a satellite broadcast. The first and second TV broadcast waves are subjected to level adjustment by amplifiers 2a and 2b respectively and, after that, the resultant signals are combined with an output of a signal synthesizer 8 which will be described later by a signal coupler 9. By signal coupler 9, a frequency multiplexed wave is generated.

On the other hand, sound signals are inputted from stereo sound signal input terminals 20L and 20R, and a video signal is inputted from video image terminal 20V. A sound signal received by input terminal 20L will be indicated as 20L, a sound signal received by input terminal 20R will be indicated as 20R, and a video signal received by input terminal 20V will be indicated as 20V.

The sound signals are inputted from stereo sound signal input terminals 21L and 21R, and a video image signal is inputted from a video input terminal 21V. A sound signal received by input terminal 21L will be indicated as 21L, a sound signal received by input terminal 21R will be indicated as 21R, and a video signal received by input terminal 21V will be indicated as 21V.

Sound signals are inputted from stereo sound signal input terminals 22L and 22R and a video signal is inputted from a video input terminal 22V. A sound signal received by input terminal 22L will be indicated as 22L, a sound signal received by input terminal 22R will be indicated as 22R, and a video signal received by input terminal 22V will be indicated as 22V.

Further, sound signals are inputted from stereo sound signal input terminals 23L and 23R and a video signal is inputted from a video input terminal 23V. The sound signal received by input terminal 23L will be indicated as 23L, a sound signal received by input terminal 23R will be called 23R, and a video signal received by input terminal 23V will be indicated as 23V.

Based on sound signals 20R and 20L and video signal 20V, a first modulated wave signal is generated in a microwave range by first modulation circuit 121. Based on sound signals 21R and 21L and video signal 21V, a second modulated wave signal is generated in the microwave range by second modulation circuit 122. Based on sound signals 22R and 22L and video signal 22V, a third modulated wave signal is generated in the microwave range by third modulation circuit 123. Based on sound signals 23R and 23L and video signal 23V, a fourth modulated wave signal is generated in the microwave range by fourth modulation circuit 124.

A specific example of a first modulation circuit 121 will be described. A stereo composite signal is generated by a stereo modulator receiving sound signals 20L and 20R. The generated stereo composite signal is frequency-modulated. After that, the frequency-modulated signal is multiplexed on video signal 20V, thereby generating a video/sound multiplex signal. The video/sound multiplexed signal is frequency-modulated by a frequency modulator in the microwave range. As a result, the first modulated signal wave is generated.

The sound and video signals may be A/D (analog/digital) converted, PCM (pulse code modulation) encoded, and digital-modulated by phase modulation or the like. Alternately, the sound and video signals may be modulated in a VHF (very high frequency) band so as to be up-converted into the microwave range.

Each of second modulation circuit 122, third modulation circuit 123, and fourth modulation circuit 124 has the configuration and function similar to those of first modulation circuit 121.

The first to fourth modulated signal waves are synthesized by signal synthesizer 8 and the resultant signal is inputted to signal coupler 9. By signal coupler 9, the first and second TV broadcast waves and the first to fourth modulated signal waves are coupled. As a result, multiplexed waves are generated on the frequency axis.

In the case of handling a high-definition signal of digital broadcast, D terminals 25 and 55 are used. The D terminal is a terminal for inputting/outputting a high-definition signal of digital broadcast and is constructed by 14 pins. Since the information amount of a signal of the D terminal is large and the bandwidth is wide, luminance signal Y and color difference signals Pb(Cb) and Pr(Cr) are transmitted independently of each other. The D terminal includes a terminal for control signal for switching the number of scan lines of a received broadcast and a spectrum ratio. In the diagram, D terminal 25 is connected to signal lines of terminals 21V, 22V and 23V, and D terminal 55 is connected to signal lines of terminals 51V, 52V and 53V.

The D terminal serves as an interface for transmitting the signals in a lump via parallel cables. An example of use of the D terminal will be described in a second embodiment.

Millimeter-wave up-converter 4 for receiving the multiplex waves will now be described. Millimeter-wave up-converter 4 includes an IF amplifier 10, a local oscillator 11, a frequency mixer (up-converter) 12, a filter 13 and a millimeter-wave amplifier 14.

IF amplifier 10 receives multiplex waves. An output of IF amplifier 10 is up-converted by frequency mixer 12 on the basis of an output (fL01) of local oscillator 11. An output of frequency mixer 12 is inputted to filter 13 and, after that, amplified by millimeter-wave amplifier 14. An output of millimeter-wave amplifier 14 is radiated from millimeter-wave antenna 3.

Figure 3A:
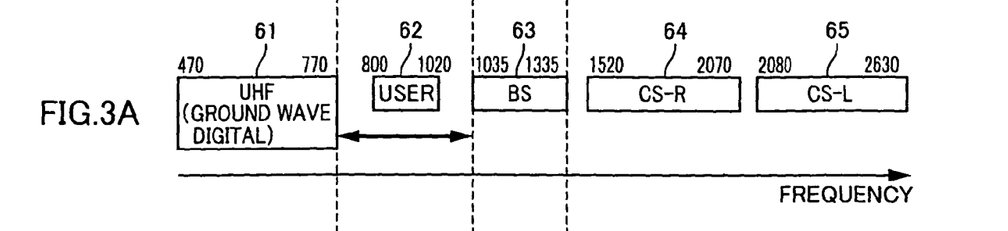
FIGS. 3A to 3C are diagrams showing an example of a sequence of signal waves according to the first embodiment.
Figure 3B:
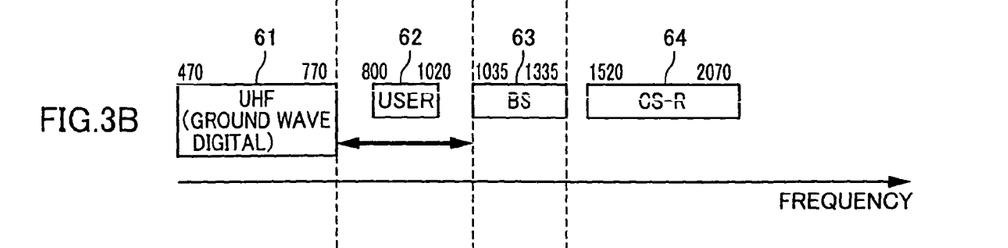
Figure 3C:
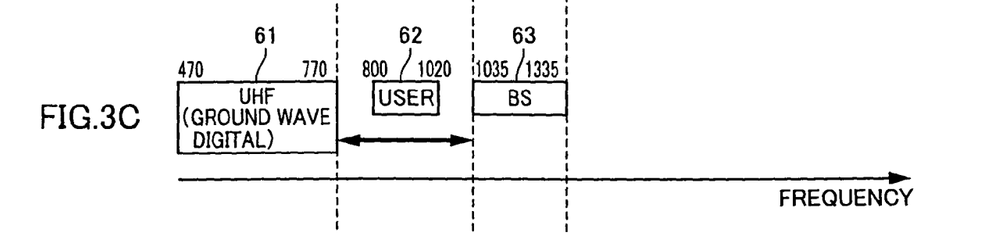

As shown in FIGS. 3A to 3C, the multiplex waves are allocated from the UHF (ultra high frequency) range to the microwave range. The frequency allocating method will be described below.

As shown in FIG. 3A, from low frequencies, the frequencies are allocated in order from a frequency band 61 of ground broadcast waves (UHF), a user range 62, a frequency band 63 of first satellite broadcast waves (BS), and frequency bands 64 and 65 of second satellite broadcast waves (CS-R and CS-L). The frequency band and corresponding signals are expressed by using the same reference numeral.

The user range denotes a frequency range of signals other than ground digital broadcast waves and satellite broadcast waves such as signals (user range signal waves) obtained by modulating personal information, for example, a video signal of a video camera. The radio frequency of the ground broadcast waves is the broadcast frequency itself which is propagated from the ground. The first satellite broadcast wave is an IF (intermediate frequency) signal itself which is frequency converted from a low noise block (LNB) converter attached to a parabolic antenna. Similarly, the second satellite broadcast wave is an IF (intermediate frequency) signal which is frequency converted by the low noise block converter.

Depending on the kind of the parabolic antenna (to which, usually, the low noise block converter is attached), as the second satellite broadcast waves, components of the horizontal and/or vertical polarized waves may be frequency-converted and re-allocated on the frequency axis. Similarly, in the case where both signals of right-polarized/left-polarized waves are used, the right-polarized or left-polarized component may be frequency-converted and re-allocated on the frequency axis.

By using first to fourth modulation circuits 121 to 124, user range 62 is allocated between frequency band 61 of the ground wave broadcast waves and intermediate frequency band 63 of the satellite broadcast waves. More specifically, the frequencies of modulated signals (carriers) of the first to fourth modulation circuits are determined so that user range 62 is allocated between frequency band 61 of the ground broadcast waves and intermediate frequency band 63 of satellite broadcast waves. Consequently, when the frequency is up-converted into the millimeter-wave band, an unnecessary gap disappears in the frequency bands, so that the frequencies can be used efficiently.

Depending on use in a house, all of ground broadcast waves 61, user range signal waves 62, first satellite broadcast waves 63, and second satellite broadcast waves 64 and 65 are not always used. In a state where the frequencies of the millimeter-wave band of each TV broadcast wave are fixed, the frequencies may be also allocated as follows.

(i) ground broadcast waves (UHF band)+user range signal waves+first satellite broadcast waves+second satellite broadcast waves, (ii) user range signal waves+first satellite broadcast waves+second satellite broadcast waves, (iii) ground broadcast waves (UHF band)+user range signal waves+first satellite broadcast waves, (iv) user range signal waves+first satellite broadcast waves, (v) ground broadcast waves (UHF band)+user range signal waves.

FIG. 3B shows the relations of ground broadcast waves (UHF) 61, user range signal waves 62, first satellite broadcast waves 63, and second satellite broadcast waves 64. FIG. 3C shows the relations of ground broadcast waves (UHF) 61, user range signal waves 62, and first satellite broadcast waves 63. In each of FIGS. 3B and 3C, user range 62 is disposed between frequency band 61 of the ground broadcast waves and intermediate frequency band 63 of the satellite broadcast waves.

Figure 4A:
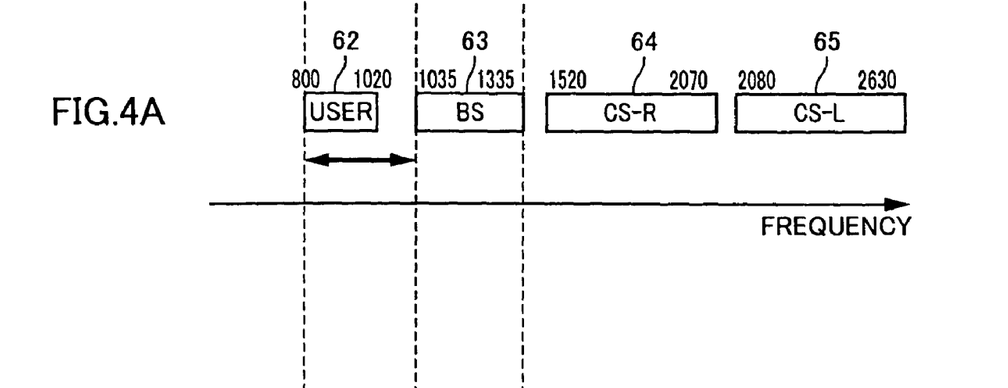
FIGS. 4A to 4C are diagrams showing an example of a sequence of signal waves according to the first embodiment.
Figure 4B:
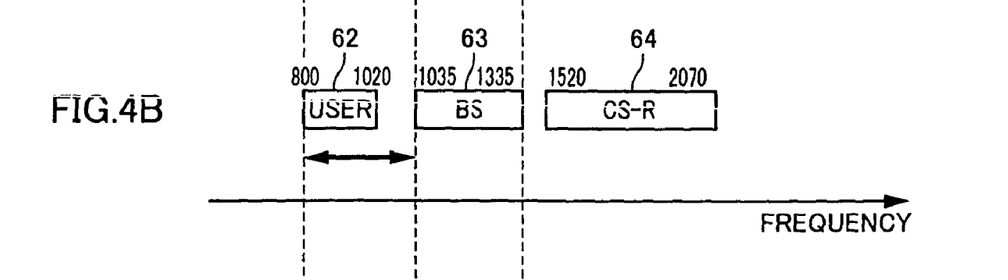
Figure 4C:
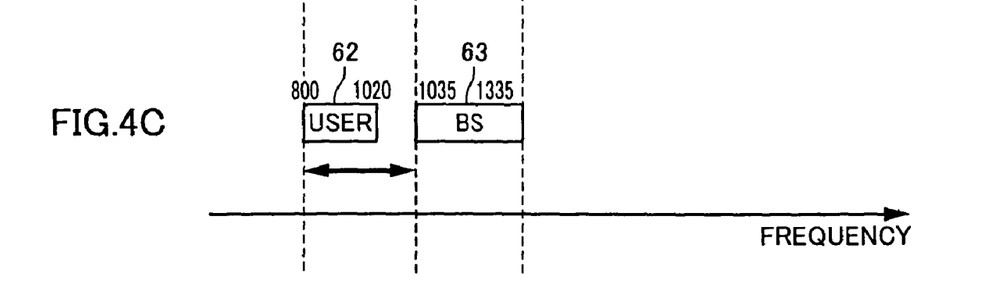

FIG. 4A shows the relations of user range signal waves 62, first satellite broadcast waves 63, and second satellite broadcast waves 64 and 65. FIG. 4B shows the relations of user range signal waves 62, first satellite broadcast waves 63, and second satellite broadcast waves 64. FIG. 4C shows the relations of user range signal waves 62 and first satellite broadcast waves 63.

Desirably, the frequency allocations used in transmitter and receiver are the same. It is possible to use a transmitter of the type (i) and a receiver of any of the types (ii) to (v). If models used are compatible with respect to the user range signal waves, ease of use is good.

With respect to analog ground broadcast waves, the case of environment in which video characteristics are adverse is also expected in some reception areas. There is the possibility that deterioration in quality of an analog video is conspicuous in radio transfer in the millimeter-wave band and transfer distance cannot be sufficiently assured. In such a case, the user range is used for transmission of analog ground broadcast waves. Specifically, video signal outputs of ground analog broadcast outputted from a TV or video are inputted to video/sound terminals of the transmitter (for example, terminals 20V, 20L and 20R, terminals 21V, 21L and 21R, terminals 22V, 22L and 22R, and terminals 23V, 23L and 23R in FIG. 1). In such a manner, up to four channels of analog ground broadcast waves can be radio-transmitted.

At the time of transmitting personal information of a video camera, a video recorder or the like, in some cases, secrecy is necessary for the user range signal waves.

Transmitter and receiver are therefore constructed in such a manner that, on the transmitter side, frequencies are allocated in frequency ranges and at frequency intervals at random in a stage of an initial product and, on the receiver side, a user channel for user range signals is set at the time of using the receiver for the first time.

Figure 2:
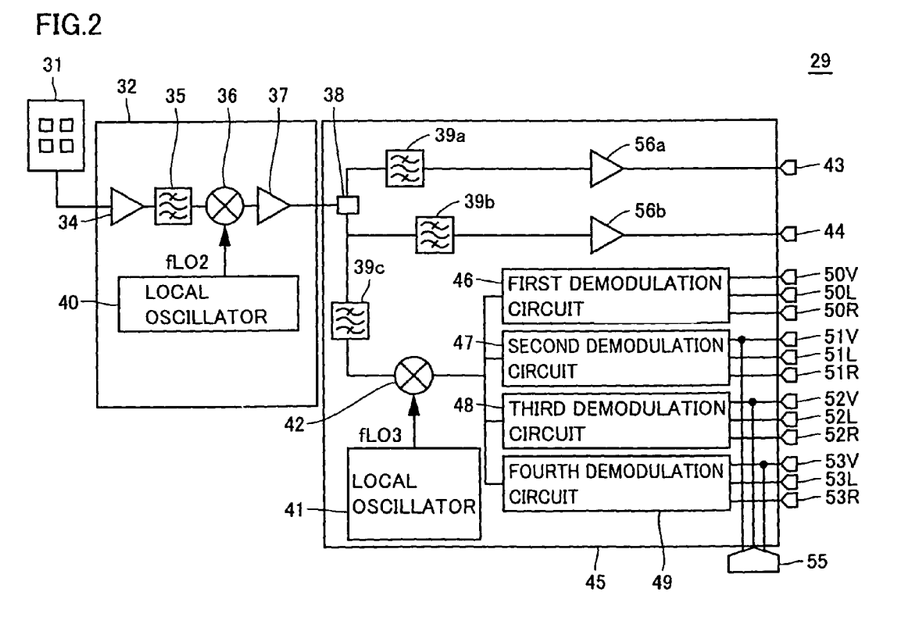
FIG. 2 is a diagram showing outline of the configuration of a millimeter-wave receiver 29 according to the first embodiment.

Specifically, millimeter-wave transmitter 15 is constructed so that the user range can be shifted from 10 MHz to 100 MHz and user ranges of a few types of frequencies are prepared. Millimeter-wave receiver 29 side is desirably constructed so that the frequency is adjusted in the user range in consideration of the shift and a use channel is initially set.

Also after start of use, the frequency is made variable on the transmission side and the frequencies on the transmission and reception sides are adjusted. More specifically, desirably, both millimeter-wave transmitter 15 and millimeter-wave receiver 29 have frequency converting functions and have functions of adjusting the frequencies in the frequency range so that interference does not occur on the transmission and reception sides and setting a use channel.

Millimeter-wave receiver 29 shown in FIG. 2 will now be described. Millimeter-wave receiver 29 has an antenna 31, a millimeter-wave down-converter 32, and an output processing circuit 45.

Millimeter-wave down-converter 32 will be described. Millimeter-wave down-converter 32 includes a low noise amplifier 34, a filter 35, a frequency mixer 36, an amplifier 37 and a local oscillator 40.

Waves received by antenna 31 are amplified by low noise amplifier 34. Filter 35 passes only desired signal waves out of output waves of low noise amplifier 34. Output waves of filter 35 are down-converted into an intermediate frequency band by frequency mixer 36 on the basis of an output (fL02) of local oscillator 40. By using the same frequencies as those of millimeter-wave local oscillator 11 on the transmission side as frequencies of local oscillator 40, the frequency components of a multiplexed signal outputted from frequency mixer 36 become the same as those of an output signal of signal coupler 9 on the transmission side. An output of frequency mixer 36 is amplified by amplifier 37.

Output processing circuit 45 will now be described. The multiplexed signal as an output of amplifier 37 is distributed into three signal waves (which will be called first signal wave, second signal wave, and third signal wave) by a frequency distributor 38. The first, second, and third signal waves are filtered by filters 39a, 39b and 39c for passing only desired signals.

TV broadcast waves (first and second signal waves) passed through filters 39a and 39b are level-adjusted by amplifiers 56a and 56b. From an output terminal 43 receiving an output of amplifier 56a, an intermediate frequency signal of satellite broadcast waves is outputted. From an output terminal 44 receiving an output of amplifier 56b, a signal of UHF ground broadcast waves is outputted.

The user range signal waves (third signal wave) passed through filter 39c are down-converted by a frequency mixer 42 on the basis of an output (fL03) of an IF band local oscillator 41 and are distributed into four signal waves.

The four signal waves outputted from frequency mixer 42 are supplied to a first demodulation circuit 46, a second demodulation circuit 47, a third demodulation circuit 48 and a fourth demodulation circuit 49, respectively.

By first demodulation circuit 46, one of the four signal waves outputted from frequency mixer 42 is demodulated. A video signal 50V is outputted from an output terminal 50V and sound signals 50R and 50L are outputted from output terminals 50R and 50L, respectively. By second demodulation circuit 47, one of the four signal waves outputted from frequency mixer 42 is demodulated. A video signal 51V is outputted from an output terminal 51V, and sound signals 51R and 51L are outputted from output terminals 51R and 51L, respectively. By third demodulation circuit 48, one of four signal waves outputted from frequency mixer 42 is demodulated. A video signal 52V is outputted from an output terminal 52V and sound signals 52R and 52L are outputted from output terminals 52R and 52L, respectively. Further, by fourth demodulation circuit 49, one of four signal waves outputted from frequency mixer 42 is demodulated. A video signal 53V is outputted from output terminal 53V and sound signals 53R and 53L are outputted from sound terminals 53R and 53L, respectively.

Figure 5:
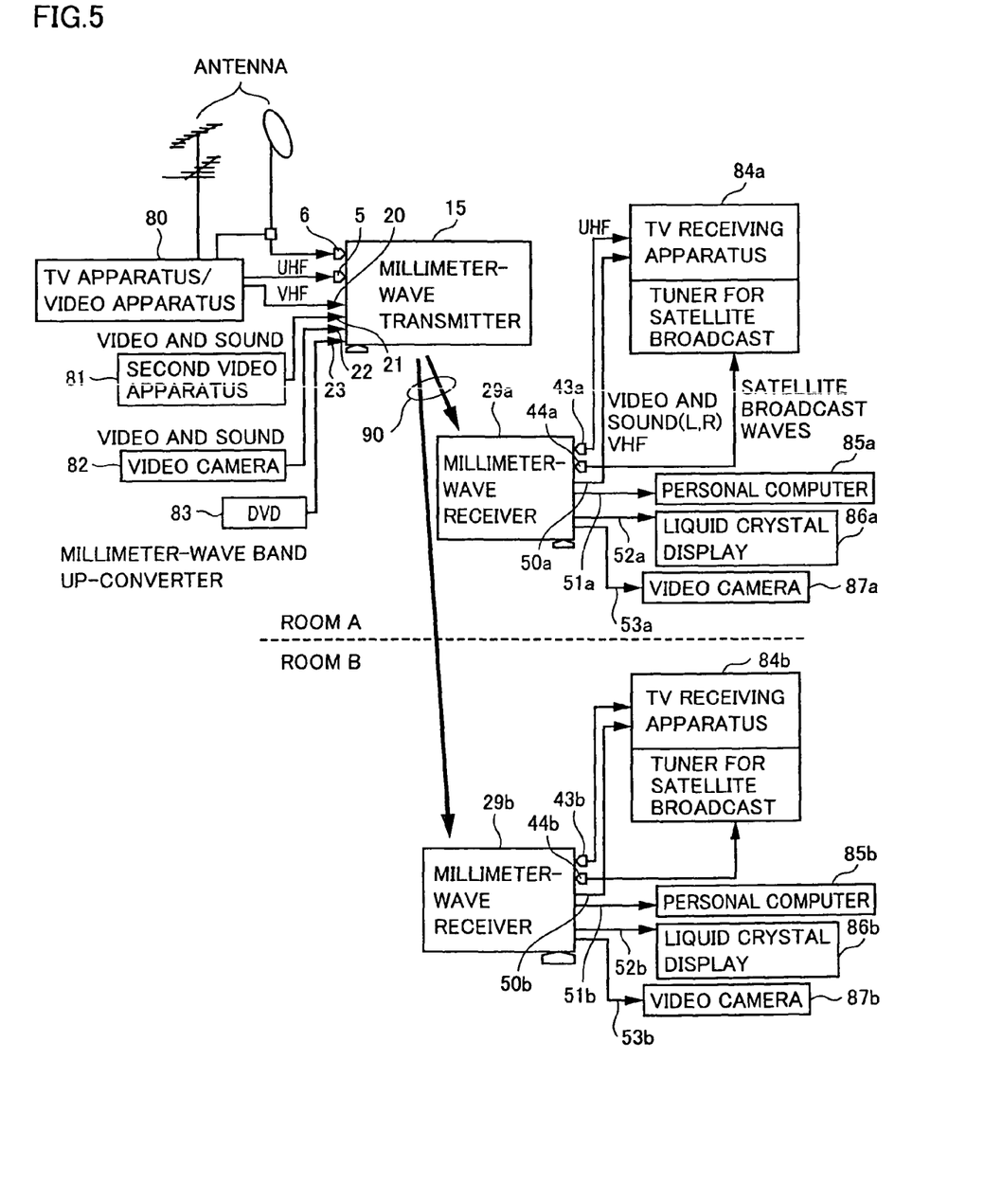
FIG. 5 is a diagram showing an example of use of the millimeter-wave receiver according to the first embodiment.

An example of use of millimeter-wave transmitter 15 and millimeter-wave receiver 29 according to the first embodiment will be described by referring to FIG. 5. FIG. 5 shows an example in which one millimeter-wave transmitter 15 and one millimeter-wave receiver 29a are disposed in a room A of a house and one millimeter-wave receiver 29b is disposed in a room B which is different from room A. Each of millimeter-wave receivers 29a and 29b has the same configuration as that of millimeter-wave receiver 29.

Mixed waves of the intermediate frequency signals of the first and second satellite broadcast waves and the ground digital broadcast waves (UHF) are inputted from input terminals 6 and 5, respectively, to millimeter-wave transmitter 15. The ground analog broadcast waves are once converted into video signals (baseband signal waves) by a TV/video apparatus 80. The video signals from TV/video apparatus 80 are inputted as the user range signal waves from first input terminal 20 to millimeter-wave transmitter 15.

Video/sound signals outputted from second video apparatus 81 are inputted from second input terminal 21 to millimeter-wave transmitter 15.

Video/sound signals outputted from video camera 82 are inputted from third input terminal 22 to millimeter-wave transmitter 15.

Further, video/sound signals outputted from a DVD 83 are inputted from fourth input terminal 23 to millimeter-wave transmitter 15.

Input terminal 20 includes terminals 20L, 20R and 20V shown in FIG. 1, input terminal 21 includes terminals 21L, 21R and 21V, input terminal 22 includes terminals 22L, 22R and 22V shown in FIG. 1, and input terminal 23 includes terminals 23L, 23R and 23V shown in FIG. 1.

As described above, the broadcast signal waves and user range signal waves are multiplexed, thereby obtaining IF multiplexed signal waves. After that, the IF multiplexed signal waves are up-converted into millimeter-wave band signals which are radio-transmitted.

Radio-transmitted millimeter-wave signal waves 90 are supplied to millimeter-wave receiver 29a in room A and millimeter-wave receiver 29b in room B. In room A, the intermediate frequency signal waves of the first and second satellite broadcast waves are outputted from an output terminal 44a of millimeter-wave receiver 29a and inputted to a first TV receiver 84a via a tuner for satellite broadcast. The ground digital signal waves in the UHF band are outputted from an output terminal 43a of millimeter-wave receiver 29a and inputted to first TV receiver 84a.

The ground analog broadcast waves transmitted as user range signal waves are outputted from a video/sound terminal 50a of millimeter-wave receiver 29a and inputted to first TV receiver 84a. Video and sound signals of second video apparatus 81 transmitted as user range signal waves are outputted from a video/sound terminal 51a of millimeter-wave receiver 29a and inputted to a personal computer 85a having video and sound terminals.

Video and sound signals of video camera 82 transmitted as user range signal waves are outputted from a video and sound terminal 52a of millimeter-wave receiver 29a and inputted to a liquid crystal display 86a. Video and sound signals of DVD 83 transmitted as user range signal waves are outputted from a video/output terminal 53a of millimeter-wave receiver 29a and inputted to a video camera 87a.

Similarly, in room B, the intermediate frequency signal waves of the first and second satellite broadcast waves are outputted from an output terminal 44b of millimeter-wave receiver 29b and inputted to a second TV receiver 84b via the tuner for satellite broadcast. The ground digital signal waves in the UHF band are outputted from an output terminal 43b of millimeter-wave receiver 29b and inputted to second TV receiver 84b.

The ground analog broadcast waves transmitted as user range signal waves are outputted from a video/sound terminal 50b of millimeter-wave receiver 29b and inputted to second TV receiver 84b. Video and sound signals of second video apparatus 81 transmitted as user range signal waves are outputted from a video/sound terminal 51b of millimeter-wave receiver 29b and inputted to a personal computer 85b having video and sound terminals.

Video and sound signals of video camera 82 transmitted as user range signal waves are outputted from a video and sound terminal 52b of millimeter-wave receiver 29b and inputted to a liquid crystal display 86b. Video and sound signals of DVD 83 transmitted as user range signal waves are outputted from a video and sound terminal 53b of millimeter-wave receiver 29b and inputted to a video camera 87b.

Terminals 43a and 43b correspond to terminal 43 in FIG. 2, and terminals 44a and 44b correspond to terminal 44 in FIG. 2. Terminals 50a and 50b include terminals 50V, 50L and 50R in FIG. 2. Terminals 51a and 51b include terminals 51V, 51L and 51R in FIG. 2. Terminals 52a and 52b include terminals 52V, 52L and 52R in FIG. 2. Terminals 53a and 53b include terminals 53V, 53L and 53R in FIG. 2.

The broadcast waves (UHF ground digital broadcast waves and first and second satellite broadcast waves) transmitted via millimeter-waves are tuned in first and second TV receivers 84a and 84b. The signal waves (signals of an electronic device) transmitted by using the user range are supplied to a corresponding device for reproduction (device 85a, 86a or 87a in room A, device 85b, 86b or 87b in room B).

With such a configuration, broadcast waves and signal waves from an electronic device other than the broadcast waves can be simultaneously and independently radio-connected. The TV broadcast waves and video and sound signals can be adapted to multiple channels.

Second Embodiment

A radio communication device according to a second embodiment will be described. The radio communication device according to the second embodiment has millimeter-wave transmitter 15 and millimeter-wave receiver 29 described as basic configuration.

Figure 6:
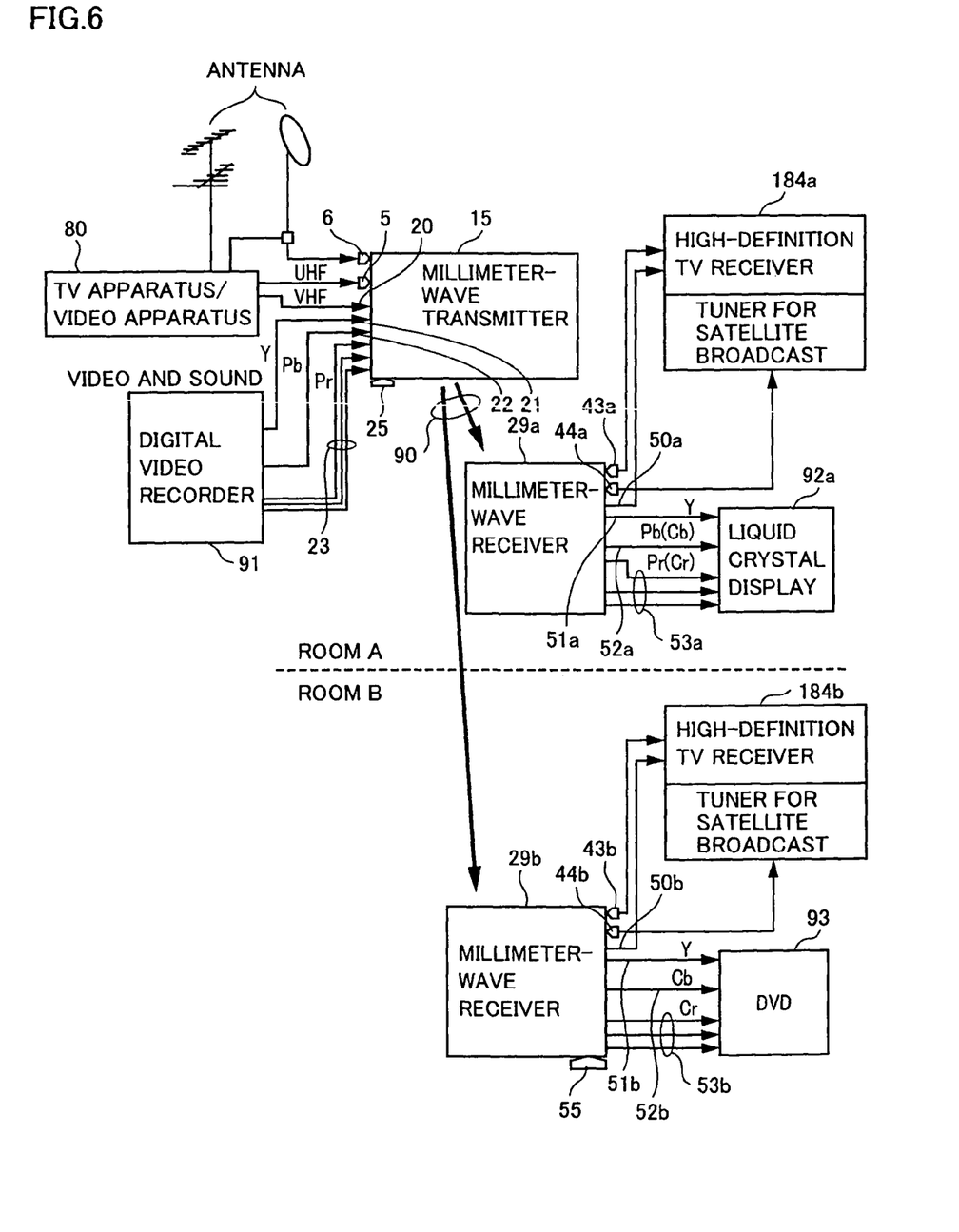
FIG. 6 is a diagram showing an example of use of the millimeter-wave transmitter/receiver according to a second embodiment.

A use example of the radio communication device according to the second embodiment will be described by referring to FIG. 6. FIG. 6 shows an example of disposing one millimeter-wave transmitter 15 and one millimeter-wave receiver 29a in room A of a house and one millimeter-wave receiver 29b is disposed in room B which is different from room A. In the second embodiment, in place of second video apparatus 81, video camera 82 and DVD 83, a digital video recorder 91 for outputting a video component signal is used.

In the second embodiment, the video component signal is transmitted by using three terminals 21, 22 and 23 out of four terminals receiving the user range signal waves. The video component signal is constructed by luminance signal Y and color difference signals Pb(Cb) and Pr(Cr). Luminance signal Y and color difference signals Pb and Pr are independently inputted to second, third, and fourth modulation circuits 122, 123 and 124 included in millimeter-wave transmitter 15 via terminals (modulators) 21, 22 and 23, respectively. The three signals are modulated independently by using modulation circuits 122, 123 and 124.

The modulated signals are synthesized by signal synthesizer 8, and broadcast waves received by terminals 5 and 6 and the modulation signal wave are coupled by signal coupler 9. The frequencies are multiplexed by signal coupler 9 and IF multiplexed waves are generated. After that, the IF multiplexed waves are up-converted into the millimeter-wave band by millimeter-wave up-converter 4. Subsequently, millimeter-wave radio transmission is carried out.

Sound stereo signals (R and L) corresponding to video component signals may be inputted to any sound terminals of the three terminals 21L, 21R, 22L, 22R, 23L and 23R. Preferably, the signals are inputted to sound terminals 23R and 23L included in terminal 23 corresponding to color difference signal Pr of the narrow transmission band.

Millimeter-wave signal waves 90 radio-transmitted are supplied to millimeter-wave receiver 29a in room A and millimeter wave receiver 29b in room B and down-converted. The down-converted signal is split to the user range signal waves and the broadcast waves in the intermediate frequency stage. Further, the user range signal waves are down-converted and independently demodulated by first to fourth demodulating circuits 46 to 49.

The demodulated ground analog broadcast waves are outputted from terminals 50a and 50b in a manner similar to the first embodiment. Demodulated signal Y is outputted from terminals 51a and 51b, demodulated signal Pb(Cb) is outputted from terminals 52a and 52b, demodulated signal Pr(Cr) is outputted from terminals 53a and 53b, and a sound signal is outputted from terminals 53R and 53L.

Outputs of terminals 43a and 50a of millimeter-wave receiver 29a and an output of terminal 44a of millimeter-wave receiver 29a are inputted to a TV receiver 184a for high definition TV. Outputs of terminals 43b and 50b of millimeter-wave receiver 29b and an output of terminal 44b of millimeter-wave receiver 29b (via a tuner for satellite broadcast) are inputted to TV receiver 184b for high definition TV.

Outputs of terminals 51a, 52a and 53a of millimeter-wave receiver 29a are supplied to, for example, a liquid crystal display 92a having a D terminal, and outputs of terminals 51b, 52b and 53b of millimeter-wave receiver 29b are supplied to, for example, a DVD 93 having a D terminal.

As the user range signal waves, only a high-definition video image is radio-transmitted in one channel. As compared with a standard image of the ordinary NTSC (National Television System Committee) system, a higher-precision image can be received.

In a use example of the second embodiment, millimeter-wave transmitter 15 and digital video recorder 91 are connected to each other via a cable for a video component. However, as shown in FIG. 1, a converter (formed by connecting 21V, 22V and 23V as video component signals to the D-terminal) from the video component signals to the D terminal side can be provided on millimeter-wave transmitter 15 side. In this case, the digital video recorder and the millimeter-wave transmitter can be connected to each other via a D-terminal cable.

Similarly, millimeter-wave receivers 29a and 29b and a high-definition TV can be connected via a D-terminal cable by providing a converter from a video component signal to D-terminal 55 side in the millimeter-wave receiver.

Although the ground digital broadcast wave and first and second satellite broadcast waves are used as TV broadcast waves in the embodiment, signal waves (CATV waves) of a cable television (CATV: cable television/community antenna television) can be also used.

Figure 7:
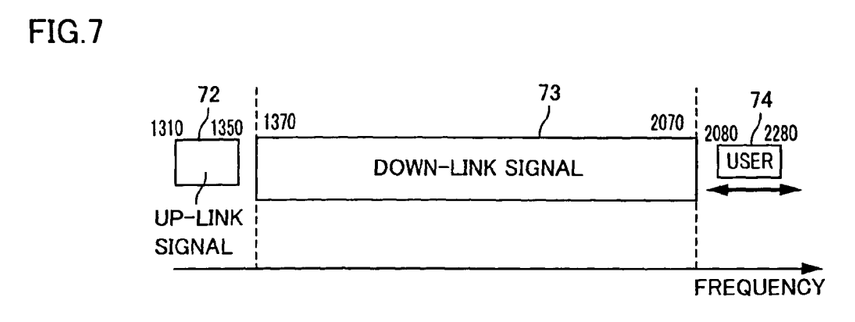
FIG. 7 is a diagram showing an example of a sequence of CATV waves according to the second embodiment.

With respect to the CATV waves, a frequency converter for once up-converting the frequency into a band from 1 GHz to 2 GHz is provided in millimeter-wave transmitter 15, as shown in FIG. 7, signal waves (USER) of the user range are allocated on a high frequency side 74 of a down-link signal part 73 of the CATV waves, and an up-link signal part 72 of the CATV waves is disposed on the low frequency side of down-link signal part 73. The signals (IF signals) allocated in such a manner are converted into millimeter-waves.

Figure 8:
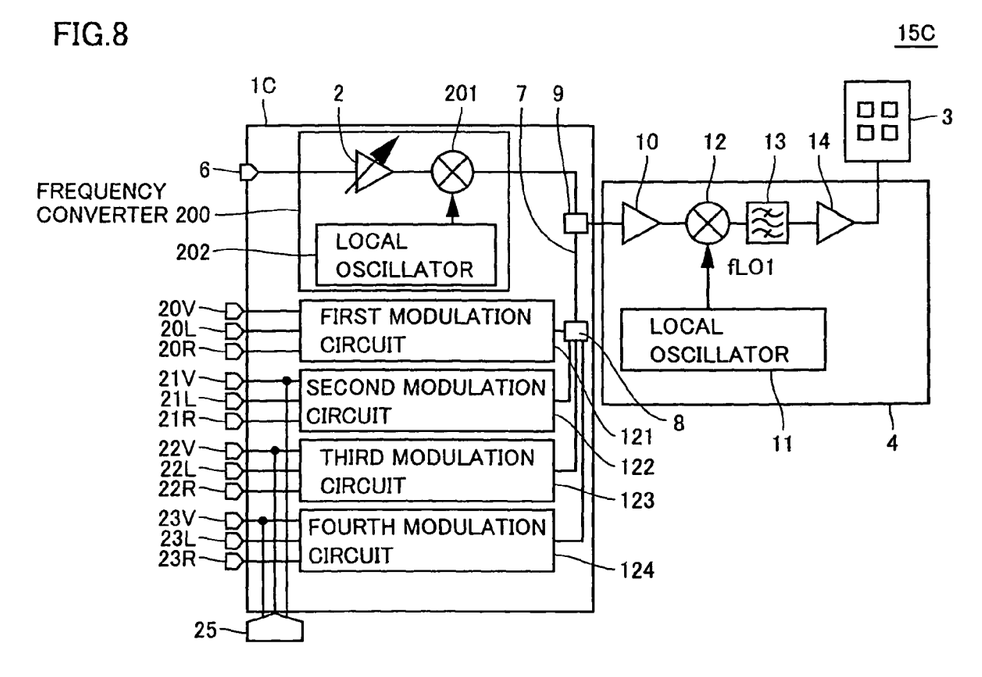
FIG. 8 is a diagram showing outline of the configuration of a millimeter-wave transmitter 15C adapted to CATV waves according to the second embodiment.
Figure 9:
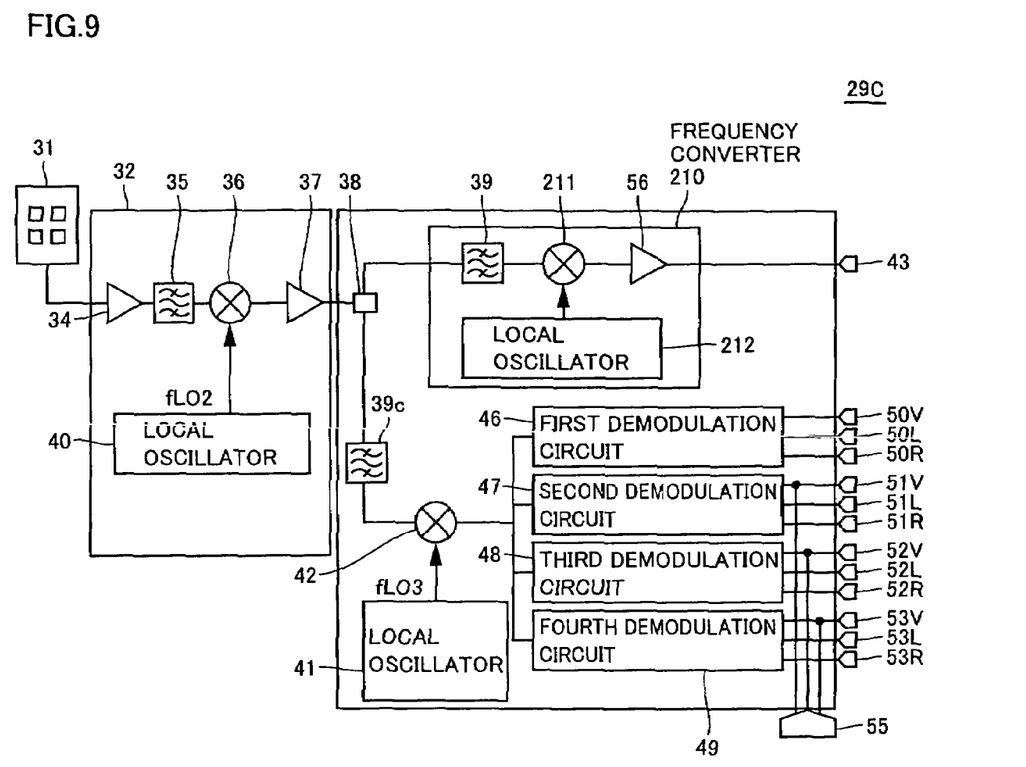
FIG. 9 is a diagram showing outline of the configuration of a millimeter-wave receiver 29C adapted to CATV waves according to the second embodiment.

An example is shown in FIGS. 8 and 9. A millimeter-wave transmitter 15C shown in FIG. 8 has an IF multiplexing circuit 1C, millimeter-wave up-converter 4, and millimeter-wave antenna 3. IF multiplexing circuit 1C has a frequency converter 200 in place of amplifiers 2a and 2b. Frequency converter 200 includes an amplifier 2, a frequency mixer 201 and a local oscillator 202. The CATV wave signals received by terminal 6 are amplified by amplifier 2. On the basis of an output of local oscillator 202, the frequency of an output of amplifier 2 is converted by frequency mixer 201 so as to satisfy the relations shown in FIG. 6. An output of frequency converter 200 and an output of signal synthesizer 8 are coupled by signal coupler 9.

A millimeter-wave receiver 29C shown in FIG. 9 has antenna 31, millimeter-wave down-converter 32, and an output processing circuit 45C. Output processing circuit 45C has a frequency converter 210 in place of filters 39a and 39b and amplifiers 56a and 56b. Frequency converter 210 includes filter 39, frequency mixer 211, local oscillator 212 and amplifier 56. The user range signal waves distributed by frequency distributor 38 are demodulated by first to fourth demodulation circuits as described above. The other CATV waves pass through a band-pass filter 39. On the basis of an output of local oscillator 212, the frequencies are converted by frequency mixer 211. An output of frequency mixer 211 is amplified by amplifier 56 and the resultant signal is outputted to terminal 43.

In the radio communication device according to the present invention, TV broadcast waves and video and sound signals from electron devices such as a video, a television camera, a personal computer or the like can be simultaneously and independently radio-connected in a house. Consequently, a plurality of such electronic devices can be carried to different rooms and used simultaneously at different places. Further, the TV broadcast waves and video and sound signals can be adapted to multiple channels, so that a plurality of electronic devices can have different video and sound information.

Further, the radio communication device multiplexes the frequency band of the user range on the intermediate frequency band of satellite broadcast and the frequency band of ground wave broadcast. Consequently, without using a frequency converter in the microwave band of the 6 GHz band or 150 GHz band, a frequency modulator of about 700 MHz to 1 GHz can be used. Thus, frequency stability is excellent and it becomes unnecessary to execute frequency multiplication. As a result, good frequency stability can be obtained and, in addition, the frequencies can be multiplexed on the satellite broadcast, ground wave broadcast, and CATV broadcast. It becomes possible to multiplex frequencies in the IF band, after that, up-convert the frequencies into the millimeter-wave band, and perform radio communications.

INDUSTRIAL APPLICABILITY

As described above, the radio communication device according to the present invention can stably transmit/receive a plurality of different signal waves, so that TV broadcast waves and video and sound signals from electronic devices such as a video, a television camera, and personal computer or the like can be simultaneously and independently radio-connected in a house. Consequently, a plurality of such electronic devices can be carried to different rooms and used simultaneously at different places. Further, the TV broadcast waves and video and sound signals can be adapted to multiple channels, so that a plurality of electronic devices can have different video and sound information.

The invention claimed is:

1. A radio communication device comprising:
   a transmitter (15) including a multiplexing circuit (1) for multiplexing broadcast waves including a ground broadcast wave, a satellite broadcast wave or a cable television broadcast wave and signal waves dedicated to the user modulated by a modulator which are different from said broadcast waves, and transmitting, as millimeter-waves, multiplexed waves in which said broadcast waves and said signal waves dedicated to the user are allocated in different positions on a frequency axis; and
   a receiver (29) including a output processing circuit (45) for receiving said multiplexed waves transmitted as millimeter-waves from said transmitter, distributing said broadcast waves, and demodulating said modulated signal waves dedicated to the user, wherein
   said broadcast waves and said signal waves dedicated to the user are simultaneously and independently radio-connected to an electronic device.

2. The radio communication device according to claim 1, wherein
   said multiplexing circuit multiplexes said broadcast waves and said signal waves dedicated to the user in accordance with said allocation in a stage of intermediate frequencies,
   said transmitter further includes an up-converter (4) for up-converting said multiplexed waves outputted from said multiplexing circuit into millimeter-waves,
   said receiver further includes:
   a receiving unit (31) for receiving an output of said transmitter; and
   a down-converter (32) for down-converting said multiplexed waves received by said receiving unit, and
   said output processing circuit distributes said broadcast waves and said signal waves dedicated to the user in a stage of intermediate frequencies.

3. The radio communication device according to claim 2, wherein
   said signal waves dedicated to the user include video and sound signals from at least one electronic devices including a television receiver, a video recorder, a video camera and a personal computer.

4. The radio communication device according to claim 1, wherein
   said signal waves dedicated to the user are multiplexed on said satellite broadcast waves in a stage of intermediate frequencies.

5. The radio communication device according to claim 4, wherein
   a frequency band of said signal waves dedicated to the user is allocated on a low frequency side of the frequency band of said satellite broadcast waves.

6. The radio communication device according to claim 1, wherein
   said signal waves dedicated to the user are multiplexed on said ground broadcast waves propagated from the ground.

7. The radio communication device according to claim 6, wherein
   the frequency band of said signal waves dedicated to the user is allocated on a high frequency side of the frequency band of said ground broadcast waves.

8. The radio communication device according to claim 1, wherein
   said signal waves dedicated to the user are multiplexed on said satellite broadcast waves in a stage of intermediate frequencies and said ground broadcast waves propagated from the ground.

9. The radio communication device according to claim 8, wherein
   the frequency band of said signal waves dedicated to the user is allocated between the frequency band of said ground broadcast waves and the frequency band of said satellite broadcast waves.

10. The radio communication device according to claim 2, wherein
    said multiplexing circuit includes:
    a converting circuit (200) for converting said cable television broadcast waves into intermediate frequencies; and
    a circuit (9) for multiplexing said cable television broadcast waves of said intermediate frequencies and said signal waves dedicated to the user.

11. The radio communication device according to claim 2, wherein
    said output processing circuit further includes:
    a distributor (38) for distributing an output of said down-converter to said broadcast wave and said signal wave dedicated to the user; and
    a demodulator (46 to 49) for receiving an output of said distributor and demodulating said signal waves dedicated to the user.

12. The radio communication device according to claim 1, wherein
    said transmitter has a function of changing a frequency band of said signal waves dedicated to the user, and
    said receiver has a function of setting a use channel of said signal waves dedicated to the user in accordance with said frequency band of said signal waves dedicated to the user.

13. The radio communication device according to claim 2, wherein
    a video component signal and a sound signal are inputted as said signal waves dedicated to the user, and
    said multiplexing circuit includes modulation means (121 to 124) for modulating said video component signal and said sound signal and a circuit (8) for multiplexing the signals after modulation.

14. The radio communication device according to claim 2, wherein
    a D-terminal video signal and a sound signal for high definition TV are inputted as said signal waves dedicated to the user, and
    said multiplexing circuit includes modulation means (122 to 124) for modulating said D-terminal video signal and said sound signal and a circuit (8) for modulating the signals after modulation.

* * * * *

UNITED STATES PATENT AND TRADEMARK OFFICE
CERTIFICATE OF CORRECTION

| | |
|---|---|
| PATENT NO. | : 7,697,574 B2 |
| APPLICATION NO. | : 10/399566 |
| DATED | : April 13, 2010 |
| INVENTOR(S) | : Eiji Suematsu et al. |

It is certified that error appears in the above-identified patent and that said Letters Patent is hereby corrected as shown below:

ON THE TITLE PAGE:

Insert the following:

-- (30)     Foreign Application Priority Data

Oct. 18, 2000     (JP)    ................. 2000-317988 --.

Signed and Sealed this
Fifteenth Day of February, 2011

David J. Kappos
*Director of the United States Patent and Trademark Office*